United States Patent
McCrae et al.

(10) Patent No.: US 6,472,343 B1
(45) Date of Patent: Oct. 29, 2002

(54) SHAPED ACTIVATED CARBON

(75) Inventors: Peter D. A. McCrae, Covington, VA (US); Tiejun Zhang, Charleston, SC (US); David R. B. Walker, Charleston, SC (US)

(73) Assignee: Westvaco Corporation, New York, NY (US)

( * ) Notice: Subject to any disclaimer, the term of this patent is extended or adjusted under 35 U.S.C. 154(b) by 0 days.

(21) Appl. No.: 09/832,005

(22) Filed: Apr. 11, 2001

(51) Int. Cl.⁷ .......................... B01J 21/18; B01J 31/00; B01J 23/02; B01J 20/22; B01J 20/02
(52) U.S. Cl. .................. 502/180; 502/183; 502/184; 502/159; 502/401; 502/402; 502/416; 502/427
(58) Field of Search ................................ 502/180, 183, 502/184, 159, 401, 402, 416, 427

(56) References Cited

U.S. PATENT DOCUMENTS

| | | | | |
|---|---|---|---|---|
| 4,409,125 A | * | 10/1983 | Nishino et al. | 502/180 |
| 4,518,704 A | * | 5/1985 | Okabayashi et al. | 502/180 |
| 5,043,310 A | * | 8/1991 | Takeuchi et al. | 502/404 |
| 5,064,805 A | * | 11/1991 | Otowa | 502/180 |
| 5,242,879 A | * | 9/1993 | Abe et al. | 502/180 |
| 5,344,626 A | * | 9/1994 | Abler | 502/180 |
| 5,691,270 A | * | 11/1997 | Miller | 502/180 |
| 5,914,294 A | * | 6/1999 | Park et al. | 502/180 |
| 6,136,749 A | * | 10/2000 | Gadkaree et al. | 502/180 |
| 6,207,264 B1 | * | 3/2001 | Robinson et al. | 428/304.4 |

* cited by examiner

*Primary Examiner*—Elizabeth D. Wood
*Assistant Examiner*—Patricia L. Hailey
(74) *Attorney, Agent, or Firm*—Terry B. McDaniel; Daniel B. Reece, IV; Richard L. Schmalz

(57) ABSTRACT

A new shaped activated carbon and the method of its manufacture are disclosed. The invention resides in the crosslinking of a polymeric cellulose, such as sodium carboxymethylcellulose (CMC), within the carbon bodies after they are shaped, employing the CMC as a binder for the activated carbon. The approach to attain product mechanical strength and water stability by crosslinking rather than high temperature heat treatment is not obvious from the prior art teaching. The crosslinking reaction occurs at temperatures below 270° C. In addition, this new binder technology produces shaped carbon bodies having key properties beyond the best level that has been accomplished with other binders.

12 Claims, 2 Drawing Sheets

SHAPED ACTIVATED CARBON

This invention relates to activated carbon. In addition, this invention relates to shaped activated carbon formed from powdered activated carbon. This invention also relates to shaped activated carbon formed from powdered activated carbon and a binder material.

BACKGROUND

Activated carbons are extensively used to purify, decolorize, deodorize, dechlorinate, and detoxicate potable waters; for solvent recovery and air purification in inhabited spaces such as restaurants, food-processing, and chemical industries; in the purification of many chemical and foodstuff products; and in a variety of gas phase applications. Activated carbons are of interest in many economic sectors and concern industries as diverse as food processing, pharmaceuticals, chemical, petroleum, mining, nuclear, automobile, and vacuum manufacturing. In particular, characterization of the carbon surface and its porous structure with respect to the chemical composition of the surface, pore size distribution, and surface area is of vital importance whenever quantitative data for processes occurring or starting at the surface of the carbon, such as surface reactions, adsorption, degassing, and surface treatment, are required.

Shaped carbon bodies are generally produced from powdered carbon particles with organic or inorganic binders. Carbon powder, binder, water, and other ingredients are mixed to form a material that is subsequently shaped. The shaped bodies of wet carbon/binder mixture must be thermally treated at high temperatures to increase product strength and water stability. For example, the prior art teaches using clay and phenolic resin polymer as binders. In particular, U.S. Pat. No. 4,677,086 to McCue et al. first disclosed the use of bentonite clay as a binder for powdered carbon, which disclosure is incorporated herein by reference. Subsequent improvements on this technology are disclosed in U.S. Pat. Nos. 5,204,310, 5,206,207, 5,238,470, 5,250,491, 5,276,000, 5,304,527, 5,538,932, 5,691,270, 5,736,481, 5,736,485, and 5,863,858, all assigned to Westvaco Corporation (hereafter, "the Westvaco patents"), the disclosures of which are incorporated herein by reference.

This prior art binder technology requires expensive plant equipment, is encumbered with a costly high temperature heat treatment step, and results in products which may fail to meet all required property characteristics for certain desired applications.

Also, other activated carbon binder technology includes U.S. Pat. No. 5,389,325 to Bookbinder et al., which describes activated carbon bodies having phenolic resin binder and describes a method to manufacture an extruded honeycomb that is water-resistant. Activated carbon powder was mixed with 5–35% phenolic resin and 4–10% organic plasticizer as an extrusion aid. The plasticizer was selected from a variety of cellulose derivatives. Thus, Bookbinder et al. teach inclusion of cellulose derivatives only as an extrusion aid in conjunction with phenolic resin as the binder material.

U.S. Pat. No. 4,866,023 to Ritter et al. discloses a process for the shaping agglomeration of particulate solids and solids produced by the process. The patentees claim a two-step process to granulate solid powders such as metal powders, insoluble metal salts, and activated carbons. Solid powders were first mixed with a polymeric binder and water to form a viscid mass that was shaped into droplets. The droplets were immediately immersed in a solution, which contained polyvalent cations such as $Ca^{2+}$, $Fe^{3+}$, $Cu^{2+}$, etc. Water stability was obtained when the metal cations reacted with the polymer binder to form water-insoluble salts.

U.S. Pat. No. 4,920,090 to Ritter et al. discloses a process for the formation of shaped agglomerates from particulate solids and claims a binder system that improves the product thermal stability over U.S. Pat. No. 4,866,023. The previous cellulosic binder was replaced with polymers containing anhydrides of dicarboxylic acid. Metal cations were replaced with anhydride-reactivated polyamines. The same two-step manufacturing process was used.

In each case, the water stability of the prior art shaped carbon body was obtained by insolubilizing the polymer binders without a high-temperature treatment. Additionally, binders, crosslinking agents, or manufacturing processes were used other than as employed in the invention herein disclosed.

Finally, U.S. Pat. No. 4,215,096 to Sinha et al. teaches impregnating activated carbon with sodium hydroxide (NaOH) for use in purification of gas streams contaminated with acid and acid precursor gases and vapors.

SUMMARY OF THE INVENTION

A binder for shaped activated carbon and a method for its manufacture have been discovered that do not require a costly high temperature heat treatment step. The inventive binder and inventive method of manufacturing shaped activated carbon comprise crosslinking of a polymeric binder, such as carboxymethylcellulose (CMC) and its derivative salts, within the activated carbon bodies after they are shaped. This approach to attain product mechanical strength and water stability by crosslinking, rather than high temperature heat treatment, is not obvious from the prior art. A crosslinking reaction occurs at temperatures up to about 270° C. In many instances, the crosslinking reaction can occur at temperatures of about 200° C. and below. In addition, this new binder technology produces shaped carbon bodies exhibiting properties beyond the best level that has been accomplished with other binders.

DESCRIPTION

Figure 2:
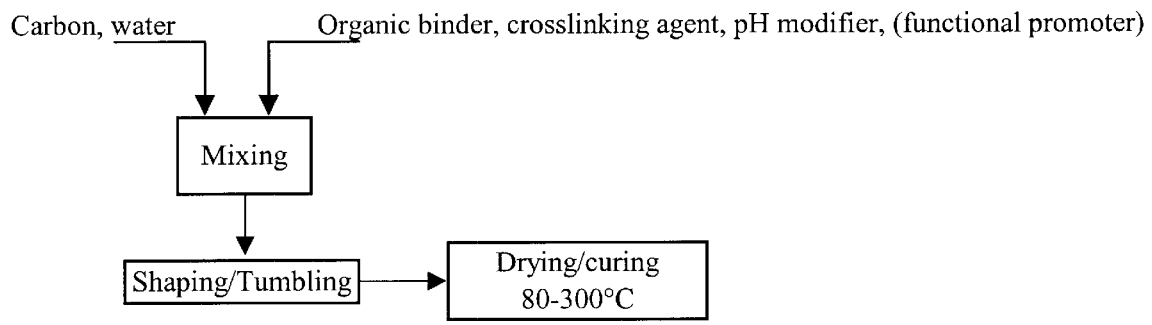
FIG. 2 is a general schematic of a method of preparing a shaped activated carbon with an organic binder for use in vapor adsorption applications, with an option of including a functional promoter in the mixing step.
Figure 3:
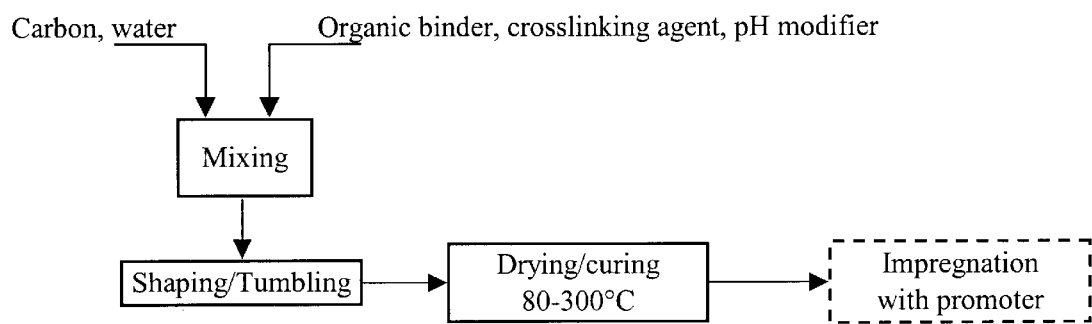
FIG. 3 is a general schematic of a method of preparing a shaped activated carbon with organic binder with or without post-impregnation with a functional promoter, for use in vapor adsorption applications.

As indicated in the embodiments of the invention represented by FIGS. 2 and 3, powdered activated carbon and a polymerizable organic binder can be added to a mixing chamber and combined with water, a base or an acid, and a crosslinking agent. The blend formed from such mixing can be shaped to form pellets, followed by drying and curing at temperatures up to about 270° C. A promoter may be added by either including it in the mixing step (FIG. 2) or impregnating it with formed pellets (FIG. 3).

The inventive binder provides shaped activated carbon with superior properties beyond the best level that has been accomplished with known shaped activated carbons made with a clay binder while maintaining similar values in other properties. An illustrative example is given for 2 mm×5 mm extruded pellets made from a Westvaco wood-based activated carbon. Compared to known (prior art) clay-bound pellets of the same size, the inventive polymeric binder-bound pellets made from the inventive method showed:

Retention of a greater gravimetric butane activity (75–85% vs. 60–70% of precursor carbon butane activity);

A lower apparent density (0.25–0.35 g/cc vs. 0.30–0.40 g/cc) so it requires less weight to fill the same volume;

A greater crush strength (2–8 kg/pellet vs. 2–4 kg/pellet) and abrasion hardness (values* of 75–100 vs. 60–85);

*Abrasion hardness was evaluated using an art-acceptable variation of the standard ASTM 3802-79 method. In the revised method specific for 2 mm pellet strength, 100 grams of sample was mixed with 30 stainless steel balls (20 with ½" diameter and 10 with ¾" diameter). The mix was shaken for 20 minutes. The pellet strength is expressed as the ratio of the mean particle diameter of the shaken material to its original mean particle diameter.

A lower initial dust (2–10 mg/dl vs. 15–40 mg/dl) and dust attrition rate (0.1–0.5 mg/dl/min vs. 1–3 mg/dl/min);

A lower ash content (<10% vs. ~20%);

An equivalent volumetric butane working capacity (BWC) depending on precursor carbon butane adsorption capacity; and An equivalent excellent water stability** of >95%.

**Water stability is determined by measuring the weight loss from carbon pellets after subjecting 10 grams of dry pellets to boiling for 15 minutes at 100° C. in 100 ml of deionized water.

An advantage of this new binder technology lies in the crosslinking of a polymerizable binder material, such as a polymeric cellulose (e.g., CMC), within the shaped carbon bodies after they are formed. By such crosslinking, the water-soluble CMC, for example, becomes insoluble in water and in many organic solvents including gasoline, toluene, tetrahydrofuran (THF), dimethylformamide (DMF), and formamide. The carbon bodies remain intact even after prolonged immersion in these liquids. Crosslinking of polymerizable binder, for example CMC, is achieved by its reactions with a polyfunctional crosslinking agent (CLA) such as, but not limited to, dimethylol urea melamine-formaldehyde, urea-formaldehyde, and polyamide epichlorohydrin. The polyvalent minerals contained in activated carbons also serve as de facto crosslinking species under certain conditions. (They appear to be most effective at pH<7.) A base (such as sodium hydroxide) or acid (such as phosphoric acid) may be added in the mixing step to adjust the pH, which dictates the carbon body water stability and the desirability of adding a crosslinking agent. A typical formulation is as follows (all percentages are by weight, based on activated carbon, binder, and CLA):

Polymeric binders: Typically, at least about 3%, based on total dry solids weight, can be used. The upper limit of polymeric binder content depends on the need for product properties. In general, increasing polymeric binder content improves product mechanical characteristics but may reduce adsorptive capacity. A polymeric binder content of 2–15% typically is used for manufacturing shaped activated carbons for, for example, automotive adsorptive applications. A content of 4–8% can also be advantageously used;

CLA: A CLA content of up to 5.0% can be used, and a content of 0.5–1.5%, is typically used for complete crosslinking;

Water: Sufficient water is added to solubilize the polymerizable binder and saturate carbon porosity. Depending on the total pore volume of activated carbon and the polymerizable binder content, the final mix moisture content varies to obtain a mixture that is suitable for subsequent shaping;

Base: Sufficient base, such as sodium hydroxide, can be added to increase pH when binding activated carbons that are acidic, such as those manufactured by phosphoric acid activation. The pH can range from 4 to 10, and typically ranges from 5 to 9, and most often ranges from 6 to 8; and Acid: Sufficient acid, such as phosphoric acid, can be added to reduce pH when binding activated carbons that are basic.

Useful organic polymerizable binders (i.e., crosslinkable by the same type of crosslinking agent) include, but are not limited to, carboxymethylcellulose (CMC) and its derivatives and its metal salts, guar gum cellulose, starch, lignin, polyvinyl alcohol, polyacrylic acid, styrene butadiene resins (SBR), and polystyrene acrylic acid resins. Water stable carbon bodies can also be made with crosslinked polyester network, including but not limited to those resulting from the reactions of polyacrylic acid or citric acid with different polyols such as glycerin, polyvinyl alcohol, lignin, and hydroxyethylcellulose.

Different types of shaped carbon bodies have been demonstrated with this inventive polymeric binder technology. These include (but are not limited to) granules, cylindrical pellets, spheres, sheets, ribbons, trilobes, and honeycombs. In principle, any desired shape of carbon body can be formed with a proper shaping device. So, shapes such as monoliths, blocks, and other modular forms are envisioned as well. This new binder technology is applicable to virtually all varieties of activated carbons, including those made from different precursor materials such as wood, coal, coconut, nutshell, and olive pit by acid, alkali, or thermal activation.

The inventive binder can work with a variety of mixing, shaping and heat treating equipment. Exemplary process schematics are shown in FIGS. 2 and 3. (For applications which do not require a functional promoter, its addition would not be included in FIG. 2, and no post-impregnation would be required in FIG. 3.) Different mixing devices such as low shear mullers, medium shear paddle mixers and high shear pin mixers have been demonstrated to produce a material that is suitable for subsequent shaping. Shaping devices such as auger extruders, ram extruders, granulators, roller pelletizers, spheronizers, and tabletting presses are suitable, depending on the applications. Drying and curing of the wet carbon bodies can be carried out at temperatures below 270° C. with a variety of different devices, such as a convection tray oven, a vibrating fluid bed dryer, and a rotary kiln. In contrast, higher temperatures of about 500–1000° C. must be used for prior art thermal treatment of clay-bound and phenolic resin-bound carbons, usually using a rotary kiln. In one embodiment of the inventive process where the product application advantageously includes functional promoter addition, the functional promoter can be added during mixing of the activated carbon powder, binder, and other ingredients prior to shaping; thus, contrary to the teaching of U.S. Pat. No. 4,215,096, cited above, a separate post-impregnation is avoided. A schematic of this process embodiment is exemplified in FIG. 2. In this process embodiment, the binder system should not require a high temperature heat treatment that would cause the promoter to decompose, to become inactive, or to interact undesirably with the carbon or binder itself. Since pellets made by the invention binder technology are water stable, functional promoters may be added by the traditional post-impregnated method (FIG. 3) in another embodiment of the invention.

The advantages provided by the disclosed invention are apparent from and not limited to the following examples:

EXAMPLE 1

In existing commercial processes, an active component that promotes the adsorptive capacity or any other function of activated carbon is usually post-impregnated onto pre-formed carbon bodies. Examples of such commercial post-impregnation processes are noted below.

Figure 1:
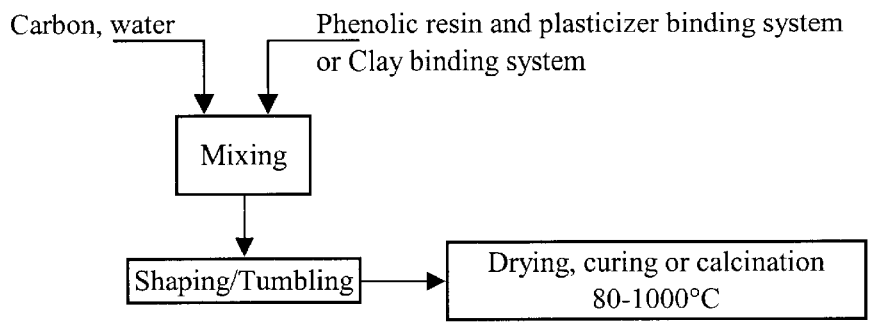
FIG. 1 is a general schematic of a prior art method of preparing clay-bound and phenolic resin-bound shaped activated carbon, for use in vapor adsorption applications.

1. In a commercial process to make carbon pellets, a functional promoter is impregnated onto pellets that are made with phenolic resin binder. Prior to impregnation, extruded pellets must be thermally treated at very high temperature ($\geq 850°$ C.) to attain the desired properties. (See, e.g., FIG. 1.)

2. Calgon granular carbon impregnated with sodium hydroxide for removal of acidic contaminants from air streams, as disclosed in U.S. Pat. No. 4,215,096, cited above.

One disadvantage of the existing commercial method of promoter incorporation is that post-impregnation requires that the carbon body be stable in the aqueous solution and retain its strength after subsequent drying. In addition, post-impregnation adds one more operation step in the manufacturing process and, thus, increases product cost.

Examples in accordance with the present invention are provided in the table below, using a sodium salt as the functional promoter to make cellulosic polymer-bound pellets that are capable of capturing acidic contaminants such as $H_2S$. The sodium salt was added during mixing in one sample (FIG. 2) and by post-impregnation in the other sample (FIG. 3).

The CMC-bound carbon samples were prepared by grinding wood-based activated carbon and mixing the ground carbon with CMC as the binder and crosslinking agent. Sodium hydroxide was added for pH adjustment. hi one experiment, functional promoter was added to the muller, as noted. Sufficient water was added to make the mixture rheology suitable for screw auger extrusion. The final mixture was shaped to 4.6 mm pellets by a pilot Bonnot extruder. The green pellets were tumbled, dried, and cured at 100–200° C. When the promoter was not added to the muller, the cured pellets were impregnated with the promoter in an aqueous solution, following the same procedure for impregnation of phenolic resin-bound pellets.

TABLE I

Comparison of Specialy Carbon (for Acid Gas Removal) Properties

|  | Binder | | |
| --- | --- | --- | --- |
|  |  | CMC | |
| Promoter added | Phenolic Resin Post-impregnation | Mixing addition | Post-impregnation |
| Promoter content | 9.9% | 9.5% | 10.4% |
| pH | 10–11 | 10.7 | 10.9 |
| $H_2S$ performance | >95% | >95% | >95% |
| AD (g/cc, db) | 0.39–0.40 | 0.39 | 0.39 |
| Water stability | >95% | >95% | >95% |
| Initial dust (mg/dl) | 5–10 | 0.7 | 1.8 |
| Dust Attrition (mg/dl/min) | 0.2–2 | 0.03 | 0.07 |
| Pellet strength | 70–85 | 74 | 74 |
| Mean particle diameter (mm) | 4.4–4.7 | 4.6 | 4.5 |

Compared with the traditional plant-produced phenolic resin-bound carbon, the invention cellulosic polymer-bound counterparts showed: a) similar, maybe slightly better, $H_2S$ adsorption performance; b) significantly lower initial dust and dust attrition rate; and c) similar density and mechanical strength.

EXAMPLE 2

This example is provided to show the benefits of the disclosed invention product and processes in the use of a polymerizable cellulose as the binder additive (in the absence of phenolic resin), as compared to using phenolic resin as the activated carbon binder with carboxymethylcellulose merely as a plasticizing extrusion aid, as taught in U.S. Pat. No. 5,389,325, cited above. These benefits are graphically depicted in FIGS. 4 and 5.

Figure 4:
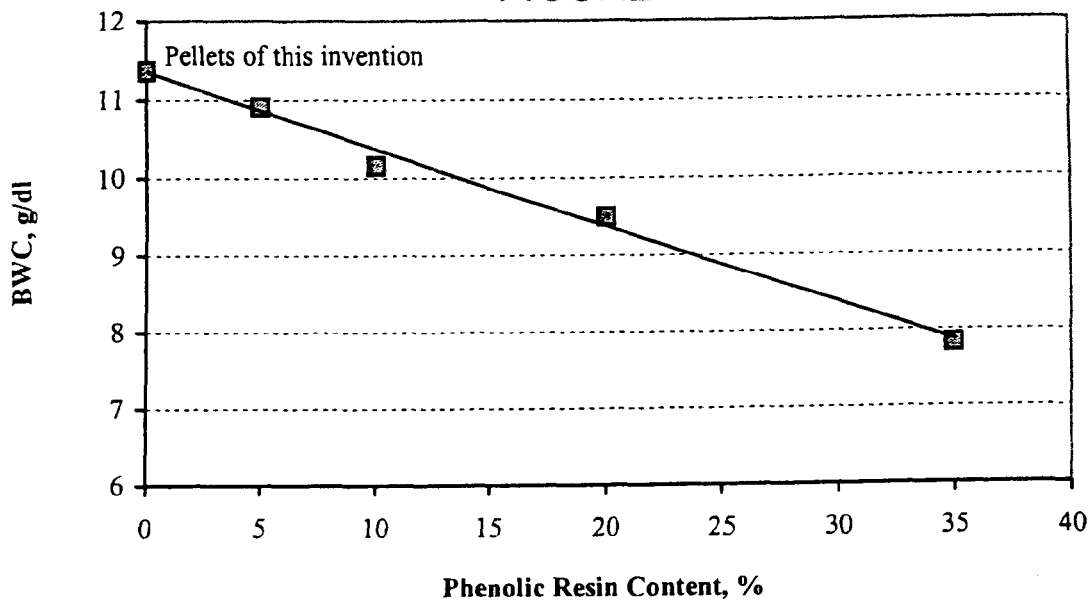
FIG. 4 is a graphic representation of the effect on the butane working capacity (BWC) of a shaped activated carbon as a result of increasing content of phenolic resin as a binder.
Figure 5:
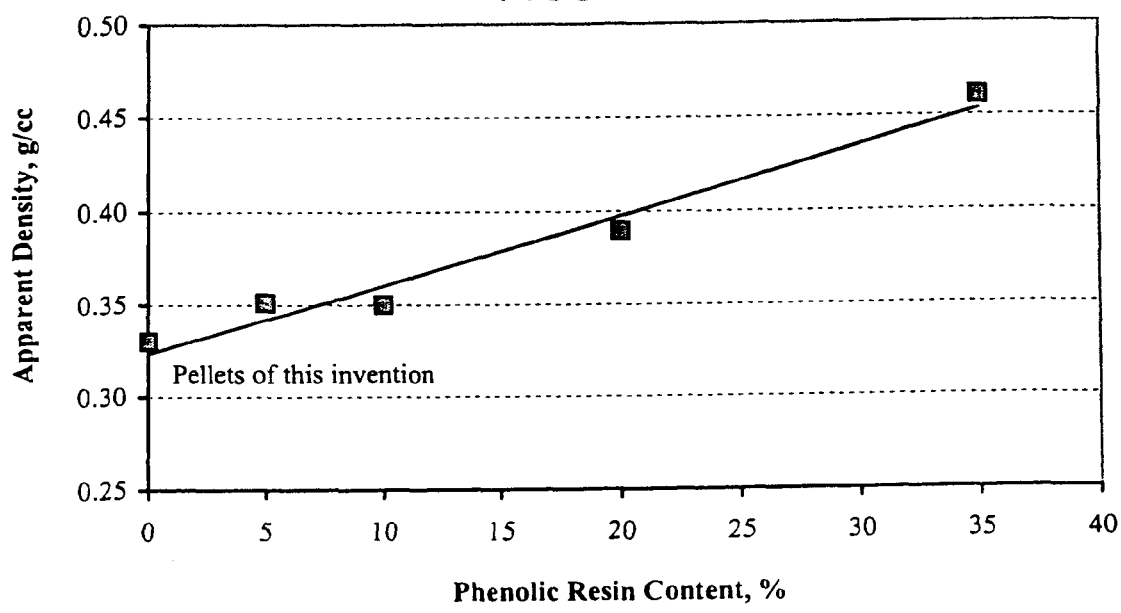
FIG. 5 is a graphic representation of the effect on the apparent density (AD) of a shaped activated carbon as a result of increasing content of phenolic resin as a binder.

The data, as graphically depicted in FIGS. 4 and 5, clearly indicate the benefits of the invention herein disclosed. As the phenolic resin content was increased, the BWC decreased markedly and the density increased. Even with as little as 5% phenolic resin, the BWC was still 0.5 g/dL below the invention product BWC value.

EXAMPLE 3

Shaped activated carbon (2 mm), manufactured and sold by Westvaco Corporation for automotive emission control is made with bentonite clay as a binder (made as disclosed in one or more of the Westvaco patents, cited earlier). The patents teach the necessity of a very high temperature treatment. Similar carbon samples were made according to the schematic of FIG. 2, without inclusion of any functional promoter. The commercial samples and invention samples were measured for ash content, and the results are shown in Table II.

TABLE II

Ash Contents of CMC-Bound and Clay-Bound Shaped Activated Carbons

|  | Samples | | | |
| --- | --- | --- | --- | --- |
| Binder | A Plant-made | B Pilot-made | C Pilot-made | Average |
| Commerical (Clay) | 25.3% | 23.3% | 23.8% | 24.1% |
| Invention (CMC) | 7.2% | 6.5% | 7.2% | 7.0% |

As shown in Table II, the CMC-bound carbon samples have an average ash content of about 7.0% vs. 24.1% for the clay-bound carbons. Thus, the new CMC binder yields a product containing less ash (<10%) than clay binder. The ash content was determined by the weight reduction after 3 hours of combustion at ~650° C. in a muffle furnace (ASTM D2866-94 [1999]).

EXAMPLE 4

In order to show the performance comparisons of CMC-bound shaped activated carbon bodies (pellets) with prior art shaped activated carbon bodies (pellets) of the same size, samples of shaped activated carbon pellets were made using each type of binder material, and their properties were measured. Clay-bound samples were prepared according to the process described in U.S. Pat. No. 4,677,086, mentioned above. The phenolic resin-based samples were prepared according to the process described in U.S. Pat. No. 5,736,485 mentioned above, which process includes a green pellet (newly formed pellet) tumbling step to reduce initial dust, as well as the pellet dust rate. The inventive CMC-bound samples were prepared as set forth and claimed herein (but without functional promoter addition). The measured properties of each sample are set forth in the following Table III.

TABLE III

CMC vs. Clay & Phenolic as Binder Material for Shaped Activated Carbon

| Binder | AD g/ml | Butane Activity g/100 g | BWC g/dL | pH | Water Stability % | Hardness | Initial Dust mg/dL | Dust Rate mg/dL/min |
|---|---|---|---|---|---|---|---|---|
| Clay | 0.36 | 39.5 | 11.9 | 7.4 | 98 | 81 | 22.2 | 0.55 |
| CMC | 0.33 | 43.2 | 12.1 | 5.8 | 96 | 94 | 7.4 | 0.10 |
| Phenolic | 0.40 | 28.8 | 9.8 | 6.2 | 96 | 99 | 5.5 | 0.07 |

The properties of the sample prepared with the polymeric cellulosic binder were essentially equal or were better than the samples prepared according to the prior art. The CMC-bound shaped activated carbon pellets had acceptable apparent density (AD), pH, water stability, and hardness, and exhibited improved activity (both butane activity and butane working capacity (BWC). While the initial dust and dust rate values were essentially equivalent to the phenolic-bound sample, those values were much improved in comparison to the clay-bound sample.

Although a benefit of the disclosed process is to provide an option to include any functional promoter in the initial mixing step, where such activity in the activated carbon product is desired (and avoid a separate post-treatment step), the disclosed invention includes various optional post-treatments to fashion the shaped activated carbon product for specialized applications. Such post-treatments may, among others, include:

(1) Thermal treatment in the presence of agents such as chlorine or silicon-halogen derivatives to render the carbon surface hydrophobic for capture of chemical species in humid atmospheres (e.g., for use in respirators, solvent recovery, vehicle exhaust);

(2) Thermal treatment in the presence of nitrogen-containing agents (ammonia, heterocyclics, hydrogen cyanide, nitrogen, urea) to incorporate nitrogen into the carbon structure and thereby impart catalytic activity for electron exchange reactions (e.g., production of glyphosate herbicide);

(3) Conversely, thermal treatment in hydrogen to block edge carbon atoms, thereby rendering the carbon surface largely non-reactive;

(4) Impregnation with phosphoric acid and/or derivatives of phosphoric acid, followed by thermal treatment to produce catalyst products for hydrodehalogenation and hydrodesulfurization reactions;

(5) Impregnation of the bound carbon with chemically reactive species, such as alkalis, alkali salts, sulfur, to impart activity for capture of pollutants through chemical reactions and/or chemisorption (e.g., capture of VOC's, $H_2S$, mercaptans, mercury);

(6) Impregnation with, and subsequent thermal treatment of, noble metal salts (e.g., of platinum, palladium) to produce carbon-supported catalysts for a wide range of applications. Similar treatment with salts of vanadium, molybdenum;

(7) Thermal treatment in ozone to oxidize the surface and enhance hydrophilicity and reactivity. Treatment with other oxidants for the same purpose, such as $HNO_3$ and $H_2O_2$;

(8) Production of molecular sieve products through thermal treatment of the CMC-bound carbon in the presence of hydrocarbons (e.g., benzene, toluene) to crack the hydrocarbon and deposit carbon in the porosity of the bound-carbon, thereby narrowing pore diameter; and (9) Impregnation with urea, potassium, and/or phosphates, and subsequent thermal treatment if desirable, to produce controlled-release fertilizers. Similar application for controlled-release pesticides.

While the invention has been described above with reference to specific embodiments thereof, it will be apparent to skilled persons that minor changes, modifications, and variations may be made to the details of the invention described herein without departing from the underlying principles of the inventive concept disclosed, including various obvious substitutions, such as substitute pH-modifying acids and/or bases. Nevertheless, the subject matter of the invention is within the bounds of the following claims.

What is claimed is:

1. A shaped activated carbon body comprising activated carbon and a cross-linked polymeric binder, selected from the group consisting of carboxymethylcellulose, and its metal salts, in the absence of phenolic resin wherein the carbon body exhibits a water stability of greater than 90% and a dust attrition of less then 0.5 mg/dl/min.

2. The shaped activated carbon body of claim 1 wherein the activated carbon is prepared from the group of precursor materials consisting of wood, coal, coconut, nutshell, and olive pit.

3. The shaped activated carbon body of claim 2 wherein the precursor material is activated by acid, alkali, or thermal activation.

4. The shaped activated carbon body of claim 1 further characterized by water stability greater than 95%.

5. The shaped activated carbon body of claim 1 shaped in the form selected from the group of shapes consisting of granules, cylindrical pellets, trilobes, spheres, sheets, ribbons, honeycombs, monoliths, and blocks.

6. The shaped activated carbon body of claim 1 shaped in the form of a cylindrical pellet.

7. The shaped activated carbon body of claim 1 further characterized by an apparent density of 0.25–0.35 g/cc, an initial dust of 10 mg/dL or less, a dust attrition rate of 0.5 gm/dL/min. or less, and an abrasion hardness value of 75–100.

8. The shaped activated carbon body of claim 1 further comprising a functional promoter selected from the group consisting of sodium hydroxide, potassium hydroxide, sodium carbonate, potassium carbonate, calcium carbonate, and magnesium carbonate.

9. The shaped activated carbon body of claim 8 shaped in the form selected from the group of shapes consisting of granules, cylindrical pellets, spheres, sheets, ribbons, trilobes, honeycombs, monoliths, and blocks.

10. The shaped activated carbon body of claim 9 shaped in the form of a cylindrical pellet.

11. The shaped activated carbon body of claim 10 further characterized by 5–30% functional promoter, 0.3–0.5 g/cc apparent density, 10 mg/dL or less initial dust, 0.5 gm/dL/min. or less dust attrition rate, and an abrasion hardness of 65–100.

12. The shaped activated carbon body of claim 10 further characterized by 10–25% functional promoter, 0.35–0.45 g/cc apparent density, 5 mg/dL or less initial dust, 0.2 gm/dL/min. or less dust attrition rate, and an abrasion hardness of 75–100.

\* \* \* \* \*

UNITED STATES PATENT AND TRADEMARK OFFICE
CERTIFICATE OF CORRECTION

PATENT NO.     : 6,472,343 B1
DATED          : October 29, 2002
INVENTOR(S)    : Peter D. A. McCrae, Tiejun Zhang and David R. B. Walker It is certified that error appears in the above-identified patent and that said Letters Patent is hereby corrected as shown below:

<u>Column 3,</u>
Lines 51-52, delete "polyamide epichlorohydrin" and substitute therefor
-- polyamide-epichlorohydrin --.

<u>Column 5,</u>
Line 58, delete "hi" and substitute therefor -- In --.

<u>Column 6,</u>
Lines 1-19, delete Table I and substitute therefor

--

TABLE I

<u>Comparison of Specialty Carbon (for Acid Gas Removal) Properties</u>

| Binder | Phenolic Resin | CMC | |
|---|---|---|---|
| Promoter added | Post-impregnation | Mixing Addition | Post-impregantion |
| Promoter content | 9.9% | 9.5% | 10.4% |
| pH | 10-11 | 10.7 | 10.9 |
| $H_2S$ performance | >95% | >95% | >95% |
| AD (g/cc, db) | .39-0.40 | 0.39 | 0.39 |
| Water stability | >95% | >95% | >95% |
| Initial dust (mg/dl) | 5-10 | 0.7 | 1.8 |
| Dust Attrition (mg/dl/min) | 0.2-2 | 0.03 | 0.07 |
| Pellet strength | 70-85 | 74 | 74 |
| Mean particle diameter (mm) | 4.4-4.7 | 4.6 | 4.5 |

--.

UNITED STATES PATENT AND TRADEMARK OFFICE
CERTIFICATE OF CORRECTION

PATENT NO.    : 6,472,343 B1
DATED         : October 29, 2002
INVENTOR(S)   : Peter D. A. McCrae, Tiejun Zhang and David R. B. Walker It is certified that error appears in the above-identified patent and that said Letters Patent is hereby corrected as shown below:

Column 8,
Line 56, after "attrition" insert -- rate --.

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,472,343 B1 Page 1 of 1
DATED : October 29, 2002
INVENTOR(S) : Peter D. A. McCrae, Tiejun Zhang and David R. B. Walker It is certified that error appears in the above-identified patent and that said Letters Patent is hereby corrected as shown below:

Column 8,
Line 56, delete "then" and substitute therefor -- than --.

Signed and Sealed this

Thirtieth Day of December, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,472,343 B1
DATED         : October 29, 2002
INVENTOR(S)   : Peter D. A. McCrae, Tiejun (NMN) Zhang, and David R. B. Walker It is certified that error appears in the above-identified patent and that said Letters Patent is hereby corrected as shown below:

Column 9,
Lines 7 and 8, delete "rate of 0.5 gm/dL/min." and insert -- rate of 0.5mg/dL/min. --.

Column 10,
Lines 7 and 8, delete "dust, 0.5 gm/dL/min." and insert -- dust, 0.5 mg/dL/min. --.
Lines 12 and 13, delete "dust, 0.2 gm/dL/min." and insert -- dust, 0.2 mg/dL/min. --.

Signed and Sealed this

Eleventh Day of April, 2006

JON W. DUDAS
*Director of the United States Patent and Trademark Office*